United States Patent [19]

O'Brien et al.

[11] Patent Number: 4,495,252
[45] Date of Patent: Jan. 22, 1985

[54] WEAR-RESISTANT METALLIC ARTICLE

[75] Inventors: James W. O'Brien, Cleveland Heights; Frank Spevak, Maple Heights, both of Ohio

[73] Assignee: Imperial Clevite Inc., Glenview, Ill.

[21] Appl. No.: 112,525

[22] Filed: Jan. 16, 1980

[51] Int. Cl.$^3$ .............................. B22F 7/08; B22F 7/04; F16C 33/00
[52] U.S. Cl. .................................. 428/555; 308/241; 308/DIG. 5; 308/DIG. 8; 419/8
[58] Field of Search .......... 308/241, DIG. 5, DIG. 8; 75/208 R, 200; 428/555

[56] References Cited

U.S. PATENT DOCUMENTS

| | | |
|---|---|---|
| 2,161,597 | 6/1939 | Swartz ............................. 75/208 R |
| 2,191,460 | 2/1940 | Fisher ................................... 192/107 |
| 2,198,253 | 4/1940 | Koehring ........................... 29/149.5 |
| 2,372,202 | 3/1945 | Hensel et al. ....................... 308/242 |
| 2,379,435 | 7/1945 | Hensel ................................. 308/242 |
| 2,887,765 | 5/1959 | Thomson ............................. 29/182 |
| 3,285,680 | 11/1966 | Dailey ................................. 428/555 |
| 3,405,610 | 10/1968 | Hill . |
| 3,715,791 | 2/1973 | Berghezan ........................... 75/246 |
| 3,795,493 | 3/1974 | Merth ................................. 29/182.5 |

OTHER PUBLICATIONS

Chemical Abstracts, vol. 69, #4656r(19).

*Primary Examiner*—Ben R. Padgett
*Assistant Examiner*—Anne Brookes
*Attorney, Agent, or Firm*—Russell E. Baumann

[57] ABSTRACT

A wear-resistant metallic article is provided which comprises a metallic substrate, a barrier layer of a metal selected from the group consisting of nickel, alloys of nickel, copper and alloys of copper on a surface of the metallic substrate and a layer of wear-resistant material bonded to the substrate, with the wear-resistant material including a mixture of nickel aluminide in a copper base matrix.

A method is provided for producing the above-described wear-resistant metallic article which method comprises the steps of (a) providing a metallic substrate, (b) affixing a barrier layer of a metal selected from the group consisting of nickel, alloys of nickel, copper and alloys of copper to a surface of the metallic substrate, (c) applying a layer of wear-resistant material over the surface of the barrier layer, with the wear-resistant material including a mixture of nickel aluminide in a copper base matrix, (d) sintering the so-applied wear-resistant material at a temperature sufficient to cause it to become bonded to the substrate, (e) compacting the sintered article an amount sufficient to cause it to have a density near theoretical, and (f) re-sintering the compacted article at a temperature sufficient to cause the wear-resistant material to become bonded together and to the substrate.

10 Claims, No Drawings

WEAR-RESISTANT METALLIC ARTICLE

BACKGROUND OF THE INVENTION

The present invention concerns a metallic article having increased wear-resistance. More specifically, the present invention relates to a wear-resistant metallic substrate having bonded to the surface thereof a wear-resistant material including a mixture of nickel aluminide in a copper base matrix and to the method of producing such an article.

Various techniques have been suggested for increasing the wear-resistance of metallic articles. Such techniques include surface hardening of the metal, such as by nitriding, whereas other techniques concern the deposition of a more resistant material on the surface of the article itself. Various carbide and nitride materials have been utilized for this purpose due to their inherent hardness.

One material which due to its hardness and crystal structure was an ideal candidate for bonding to a metallic substrate to increase its wear resistance is nickel aluminide ($Ni_2Al_3$). However, when it was attempted to bond nickel aluminide to a metallic substrate many difficulties were experienced. When aluminum from the nickel aluminide comes into contact with oxygen, an inert layer of aluminum oxide is formed on the surface of the concerned particle which interferes with the bonding between the particles and the substrate.

Accordingly, it is the principal object of the present invention to provide a metallic article having bonded to the surface thereof a wear-resistant material which includes nickel aluminide.

Another object of the invention is to provide a method for producing a metallic substrate having bonded to the surface thereof a wear-resistant material which includes nickel aluminide.

Other objects of the invention will become apparent to those skilled in the art from a reading of the following description and claims

SUMMARY OF THE INVENTION

In one aspect, the present invention concerns a method for producing a metallic substrate having bonded thereto a wear-resistant surface containing nickel aluminide in a copper base matrix, which process comprises the steps of:

(a) providing a metallic substrate;
(b) affixing a barrier layer of a metal selected from the group consisting of nickel, alloys of nickel, copper and alloys of copper to a surface of the metallic substrate;
(c) applying a layer of wear-resistant material over the surface of the barrier layer, with the wear-resistant material including a mixture of nickel aluminide and a copper base alloy;
(d) sintering the so-applied wear-resistant material at a temperature sufficient to cause it to become bonded to the substrate;
(e) compacting the sintered article an amount sufficient to cause it to have a density near theoretical; and
(f) re-sintering the article at a temperature sufficient to cause the wear-resistant material to become bonded together and to the substrate.

In another aspect, the present invention relates to a wear-resistant metallic article which comprises:

(a) a metallic substrate;
(b) a barrier layer of a metal selected from the group consisting of nickel, alloys of nickel, copper and alloys of copper affixed to a surface of the metallic substrate; and
(c) a layer of wear-resistant material bonded to the surface of the barrier layer with the wear-resistant material including a mixture of nickel aluminide and a copper base alloy.

DESCRIPTION OF THE PREFERRED EMBODIMENT OF THE INVENTION

The wear-resistant metallic article of the invention can take many different forms. That is, it can be produced in the form of fabricate or unfabricate product. For example, unfabricate product can be used to make various support parts for pumps such as piston sleeves, wear and port plates and other moving components The wear-resistant metallic article of the invention is intended for use where metal-to-metal contact occurs and where conventional bearing alloys will wear rapidly and excessively The substrate used to produce the article of the invention is fabricated from a ferrous metal and is preferrably made of steel. It can be produced in essentially any desired form.

The barrier layer can be any metal selected from the group consisting of nickel, alloys of nickel, copper and alloys of copper. If nickel or a nickel alloy is used as the barrier layer, it is preferred to apply or affix such material to the substrate by conventional electrodeposition techniques. In this regard, the minimum thickness of nickel or nickel alloy required to produce a good barrier layer is about 0.0005 inch. When copper or a copper alloy is used as a barrier layer, it is preferred to bond the concerned metal to the substrate by sintering. In this instance, minimum desired thickness of metal is about 0.002 inch.

The wear-resistant material is preferrably a mixture of nickel aluminide ($Ni_2Al_3$) and a copper base metal or alloy. In this regard, it is desired that the copper base metal or alloy contain in excess of 65 weight percent copper with the remainder being other metals, such as tin and zinc, which will not interfere with the bonding of the wear-resistant material to the substrate via the barrier layer. In practice, it has been found desirable to add lead to the mixture of nickel aluminide and copper base alloy material to produce a surface layer which has increased machinability. That is, it is desirable to have lead present, but it is not necessary for the practice of the subject invention.

In the practice of the present invention, it has been discovered that excellent results can be achieved when the nickel aluminide powder utilized to form the wear-resistant material prior to sintering has a hardness of from about 820 to about 1,030 DPH.

The wear-resistant material preferrably includes from about 2 to about 20 volume percent nickel aluminide with the remainder being a copper base alloy. In practice, the preferred composition of the wear-resistant material ranges from about 2 to about 20 volume percent nickel aluminide with the balance being leaded bronze. In this regard, one leaded bronze composition which has been found to be well-suited to the practice of the subject invention consists, in weight percent, of about 89.5 percent copper, about 8.5 percent tin and about 2 percent lead. When bronze is used as the copper base matrix material, it is desirable to utilize a material which contains, in weight percent, from about 87 percent to about 98 percent copper and from about 2 percent to about 11 percent tin.

The invention will now be described with reference to the following examples which are set forth herein for the purpose of illustrating the invention and not for the purpose of limiting the same.

EXAMPLE I

A 0.070 by 5.0 by 6.0 inch steel strip was provided. A 0.015 inch thick layer of bronze (90 percent copper—10 percent tin) pre-alloyed powder was deposited on the surface of the steel strip. The strip was then sintered in a reducing atmosphere at a temperature of about 1580° F. for a period of from about 2–5 minutes. The so-sintered strip was then removed from the furnace, cooled and rolled an amount sufficient to reduce the bronze layer to near its theoretical density. A layer of wear-resistant material (5 volume percent nickel aluminide with the balance being leaded bronze having a nominal composition of 89.5 percent copper, 8.2 percent tin and 2 percent lead) was then applied to the barrier layer formed on the steel substrate or strip. The so-produced structure was then sintered in a reducing atmosphere at about 1350° F. for a period of about 2–5 minutes. The strip was then cooled in the reducing atmosphere and then rolled an amount sufficient to compact the sintered layer to near theoretical density. After rolling, the article was then re-sintered in a reducing atmosphere at a temperature of about 1350° F. for a period of about 6–20 minutes. The duration of the sintering was such that the wear-resistant material became bonded together and, in turn, to the substrate by being bonded to the barrier layer.

EXAMPLE II

The procedure of Example I was repeated except that the resultant product was re-compacted and then subjected to an annealing treatment in a reducing atmosphere at a temperature of about 1350° F. for a period of about 15–25 minutes.

EXAMPLE III

A 0.100 by 5 by 6 inch steel substrate was provided. A 0.001 inch thick layer of nickel was electrodeposited by conventional techniques on one surface of the steel strip. A layer of wear-resistant material (5 volume percent nickel aluminide with the balance being leaded bronze having a nominal composition of 89.5 percent copper, 8.2 percent tin and 2 percent lead) was then applied to the barrier layer formed on the steel strip or substrate. The so-produced structure was then sintered in a reducing atmosphere at about 1350° F. for a period of about 2–5 minutes. The strip was then cooled in the reducing atmosphere and then rolled an amount sufficient to compact the sintered layer to near theoretical density. After rolling, the article was then re-sintered in a reducing atmosphere at a temperature of about 1350° F. for a period of about 15–20 minutes. The duration of the sintering was such that the wear-resistant material became bonded together and, in turn, to the substrate by being bonded to the barrier layer.

EXAMPLE IV

The procedure of Example III was repeated except that the resultant product was re-compacted and then subjected to annealing treatment in a reducing atmosphere at a temperature of about 1350° F. for a period of about 15–25 minutes.

Wear-resistant metallic articles produced as described above can be blanked and formed by conventional techniques into the desired final product. To demonstrate the utility of the subject invention and to simulate metal-to-metal contact encountered in hydraulic pumps at high pressure, a conventional LWF-1 wear testing machine (produced by Saville LeVally Corporation) was used to compare the wear-resistance of various materials produced according to the subject invention and articles treated according to the prior art (a manganese bronze surface). The apparatus utilized rubs the test specimen against a hard steel ring bathed in hydraulic oil. Typical of the results of such tests are the following:

| Material | Avg. Wear Scar Width After 5,000 Cycles | Coefficient of Friction |
|---|---|---|
| Manganese Bronze CDA-673 | .099 | .133 |
| 5 vol. % Al$_3$Ni$_2$ in leaded bronze | .115 | .136 |
| 10 vol. % Al$_3$Ni$_2$ in leaded bronze | .108 | .113 |
| 15 vol. % Al$_3$Ni$_2$ in leaded bronze | .105 | .113 |

From the foregoing, it is clear that the subject invention provides a superior wear-resistant article which can be used to form various wear-resistant articles.

While there have been described herein what are at present considered to be the preferred embodiments of this invention, it will be apparent to those skilled in the art that various changes and modifications may be made therein without departing from the invention, and it is, therefore, intended in the appended claims to cover all such changes and modifications as fall within the true spirit and scope of the invention.

What is claimed is:

1. A method of producing a metallic substrate having bonded thereto a wear-resistant surface containing nickel aluminide in a copper base matrix with lead which process comprises the steps of:
   (a) providing a metallic substrate;
   (b) affixing a barrier layer of a metal selected from the group consisting of nickel, alloys of nickel, copper and alloys of copper to a surface of the metallic substrate;
   (c) applying a layer of wear-resistant material over the surface of said barrier layer, with said wear-resistant material including a mixture of nickel aluminide and a copper base alloy;
   (d) sintering said so-applied wear-resistant material at a temperature sufficient to cause it to become bonded to said substrate;
   (e) compacting the sintered layer an amount sufficient to cause it to have a density near theoretical; and
   (f) re-sintering said article at a temperature sufficient to cause the wear-resistant material to become bonded together and to the substrate.

2. The method of claim 1 wherein the metallic substrate is fabricated from steel.

3. The method of claim 1 wherein said barrier layer is composed of a metal selected from the group consisting of nickel and alloys of nickel and has a thickness of greater than about 0.0005 inch.

4. The method of claim 1 wherein said barrier layer is composed of a metal selected from the group consisting of copper and alloys of copper and has a thickness of greater than about 0.002 inch.

5. The method of claim 1 wherein said wear-resistant material contains from about 2 to about 20 volume percent nickel aluminide with the balance being a copper base alloy.

6. A wear-resistant metallic article which comprises:
   (a) a metallic substrate;
   (b) a barrier layer of a metal selected from the group consisting of nickel, alloys of nickel, copper and alloys of copper bonded to a surface of the metallic substrate; and
   (c) a layer of wear-resistant material bonded to the surface of said barrier layer, with said wear-resistant material including a mixture of nickel aluminide and copper base alloy with lead.

7. A wear-resistant metallic article according to claim 6 wherein the metallic substrate is fabricated from steel.

8. A wear-resistant metallic article according to claim 6 wherein said barrier layer is composed of a metal selected from the group consisting of nickel and alloys of nickel and has a thickness of greater than about 0.0005 inch.

9. A wear-resistant metallic article according to claim 6 wherein said barrier layer is composed of a metal selected from the group consisting of copper and alloys of copper and has a thickness of greater than about 0.002 inch.

10. A wear-resistant metallic article according to claim 6 wherein said wear-resistant material contains from about 2 to about 20 volume percent nickel aluminide with the balance being a copper base alloy.

* * * * *